US009276887B2

(12) United States Patent
Jalisatgi et al.

(10) Patent No.: US 9,276,887 B2
(45) Date of Patent: Mar. 1, 2016

(54) SYSTEMS AND METHODS FOR MANAGING SECURITY CERTIFICATES THROUGH EMAIL

(71) Applicant: Symantec Corporation, Mountain View, CA (US)

(72) Inventors: Pradeep Jalisatgi, Bangalore (IN); Alok Naik, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 49 days.

(21) Appl. No.: 14/268,111

(22) Filed: May 2, 2014

(65) Prior Publication Data

US 2015/0271122 A1    Sep. 24, 2015

(30) Foreign Application Priority Data

Mar. 19, 2014   (IN) .............................. 342/KOL/2014

(51) Int. Cl.
*H04L 29/06* (2006.01)
*H04L 12/58* (2006.01)
*H04L 9/32* (2006.01)

(52) U.S. Cl.
CPC .............. *H04L 51/18* (2013.01); *H04L 9/3268* (2013.01); *H04L 63/0823* (2013.01)

(58) Field of Classification Search
CPC .... H04L 51/18; H04L 9/3268; H04L 63/0923
USPC ........................................................ 713/158
See application file for complete search history.

(56) References Cited

U.S. PATENT DOCUMENTS

| 6,510,513 | B1 * | 1/2003 | Danieli ........................ 713/156 |
| 6,721,783 | B1 * | 4/2004 | Blossman et al. ............ 709/206 |
| 8,347,093 | B1 * | 1/2013 | Ahmed ......................... 713/168 |
| 2003/0187942 | A1 * | 10/2003 | Quine et al. ................... 709/207 |
| 2007/0168658 | A1 * | 7/2007 | Yamauchi ..................... 713/156 |
| 2008/0209208 | A1 * | 8/2008 | Parkinson ..................... 713/156 |
| 2008/0227391 | A1 * | 9/2008 | Rosenberg ................... 455/41.1 |
| 2010/0070419 | A1 * | 3/2010 | Vadhri ............................ 705/71 |
| 2014/0366128 | A1 * | 12/2014 | Venkateswaran et al. ...... 726/19 |

OTHER PUBLICATIONS

"Certificate signing request", http://en.wikipedia.org/wiki/Certificate_signing_request, as accessed Feb. 12, 2014, Wikipedia, (Apr. 13, 2005).
"Public key certificate", http://en.wikipedia.org/wiki/Public_key_certificate, as accessed Feb. 12, 2014, Wikipedia, (Feb. 28, 2004).
"X.509", http://en.wikipedia.org/wiki/X.509, as accessed Feb. 12, 2014, Wikipedia, (Jul. 4, 2004).

* cited by examiner

*Primary Examiner* — Michael S McNally
(74) *Attorney, Agent, or Firm* — ALG Intellectual Property, LLC (57) ABSTRACT

The disclosed computer-implemented method for managing security certificates through email may include (1) receiving an encrypted email that contains both identifying information that identifies a security certificate for authenticating a website and a management command relating to the security certificate, (2) determining whether authentication of the encrypted email succeeded such that the management command is authorized, and (3) when a determination is made that authentication of the encrypted email succeeded, identifying the security certificate using the identifying information and executing the management command with respect to the identified security certificate. Various other methods, systems, and computer-readable media are also disclosed.

20 Claims, 7 Drawing Sheets

SYSTEMS AND METHODS FOR MANAGING SECURITY CERTIFICATES THROUGH EMAIL

BACKGROUND

Modern ecommerce typically requires some level of encryption and authentication between online vendors and buyers. Authentication of a message may ensure, for example, that a purported author of the message is the actual author of the message. Similarly, encryption may disguise a message so that the message is only readable to one who possesses a method for decrypting the message, such as a decryption key.

Both authentication and encryption may be achieved through public key cryptography, which typically involves a pair of keys: a public key and a private key. Modern ecommerce sites may attempt to maintain the integrity of transactions by ensuring authenticity and encryption through public key cryptography. More specifically, modern ecommerce sites may each provide a security certificate, based on public key cryptography, that authenticates the ecommerce sites.

Unfortunately, managing these certificates may become burdensome. For example, users may be required to log in to a separate portal and perform actions (e.g., approving, revoking, and/or renewing certificates) through the portal interface. The process of logging in to a certificate management services portal may be both clumsy and time consuming. For example, users may be required to login to the portal to approve each and every certificate issued by the certificate authority. Accordingly, the instant disclosure identifies a need for improved methods for managing security certificates.

SUMMARY

As will be described in greater detail below, the instant disclosure describes various systems and methods for managing security certificates through email by, for example, attempting to authenticate emails that contain management commands and, if authentication succeeds, executing the management commands. In one example, a computer-implemented method for managing security certificates through email may include (1) receiving an encrypted email that contains both identifying information that identifies a security certificate for authenticating a website and a management command relating to the security certificate, (2) determining whether authentication of the encrypted email succeeded such that the management command is authorized, and (3) when a determination is made that authentication of the encrypted email succeeded, identifying the security certificate using the identifying information and executing the management command with respect to the identified security certificate.

In some embodiments, the method may further include, when a determination is made that authentication of the encrypted email failed, declining to execute the management command. Moreover, the management command may include (1) an accept command to accept the security certificate, (2) a revoke command to revoke the security certificate, and/or (3) a reject command to reject the security certificate. Similarly, the encrypted email may contain, as the management command, the literal text (1) "accept," (2) "revoke," and/or (3) "reject."

In some examples, the management command may be contained within (1) a body of the encrypted email, (2) a subject line of the encrypted email, and/or (3) an attachment to the encrypted email. In further examples, the encrypted email may be digitally signed to authenticate an author of the encrypted email. Moreover, the encrypted email may be digitally signed using a SECURE/MULTIPURPOSE INTERNET MAIL EXTENSIONS ("S/MIME") standard.

In some embodiments, the identifying information that identifies the security certificate may include a serial number for the security certificate and/or a domain name that the security certificate authenticates. In further examples, the management command may be executed based on the determination that authentication of the encrypted email succeeded without further input from an author of the encrypted email.

In some examples, the method may further include, upon executing the management command, automatically sending a reply email to a source of the encrypted email. The reply email may indicate that the management command was executed. In additional examples, the encrypted email may include a reply to a notification email, from a security certificate management service, that indicated an offer to issue the security certificate. Moreover, the security certificate management service may have sent the notification email that indicated the offer to issue the security certificate in response to a certificate signing request.

In some embodiments, the security certificate may include a TRANSPORT LAYER SECURITY certificate and/or a SECURE SOCKETS LAYER certificate. In further embodiments, the identifying information that identifies the security certificate may include a copy of the security certificate.

In one embodiment, a system for implementing the above-described method may include (1) a reception module, stored in memory, that receives an encrypted email that contains both identifying information that identifies a security certificate for authenticating a website and a management command relating to the security certificate, (2) a determination module, stored in memory, that determines whether authentication of the encrypted email succeeded such that the management command is authorized, (3) an execution module, stored in memory, that, when a determination is made that authentication of the encrypted email succeeded, identifies the security certificate using the identifying information and executes the management command with respect to the identified security certificate, and (4) at least one processor that executes the reception module, the determination module, and the execution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive an encrypted email that contains both identifying information that identifies a security certificate for authenticating a website and a management command relating to the security certificate, (2) determine whether authentication of the encrypted email succeeded such that the management command is authorized, and (3) when a determination is made that authentication of the encrypted email succeeded, identify the security certificate using the identifying information and execute the management command with respect to the identified security certificate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing security certificates through email. As will be explained in greater detail below, the disclosed systems and methods may enable web domain owners, and others associated with websites, to more easily and conveniently manage security certificates for authenticating websites. Specifically, in some examples, the disclosed systems and methods may enable individuals to execute management commands (such as accept, renew, revoke, and reject) on security certificates through signed and encrypted emails without needing to access a certificate management service portal.

Figure 1:
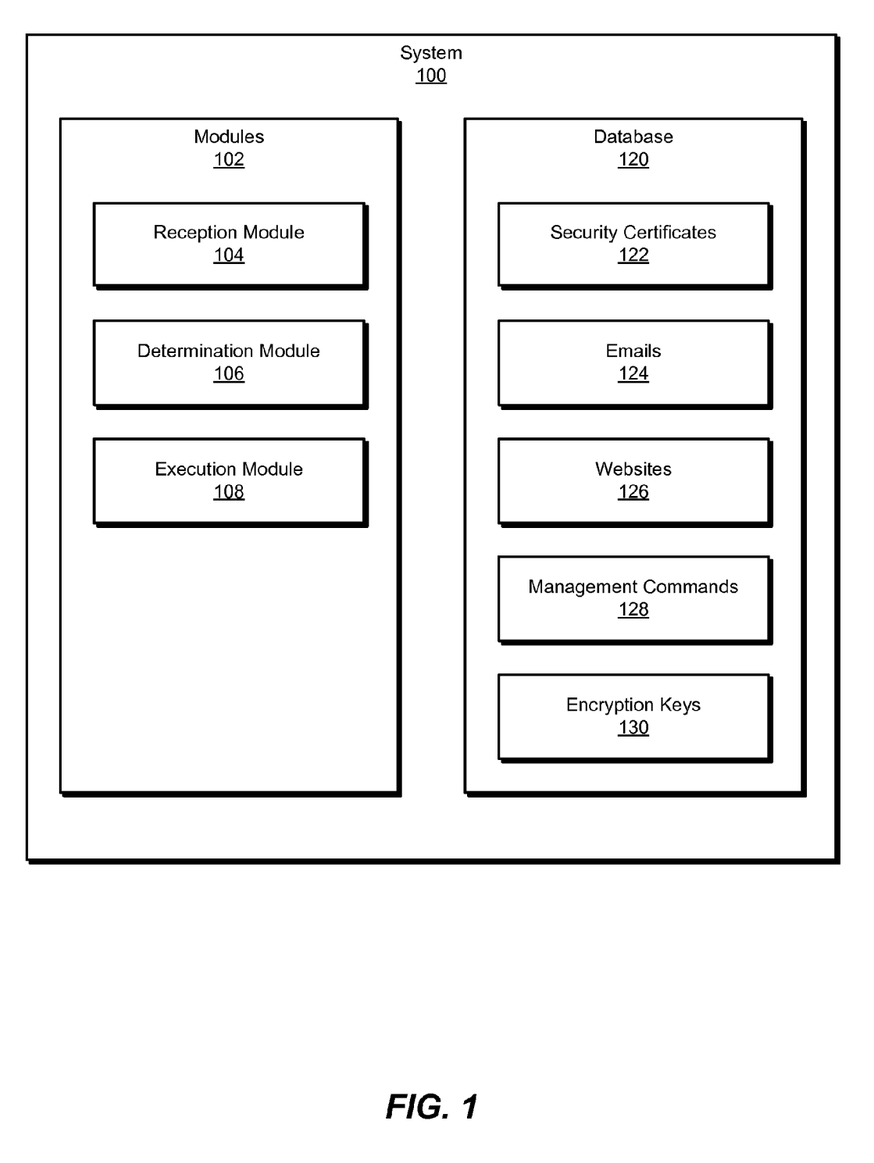
FIG. 1 is a block diagram of an exemplary system for managing security certificates through email.
Figure 2:
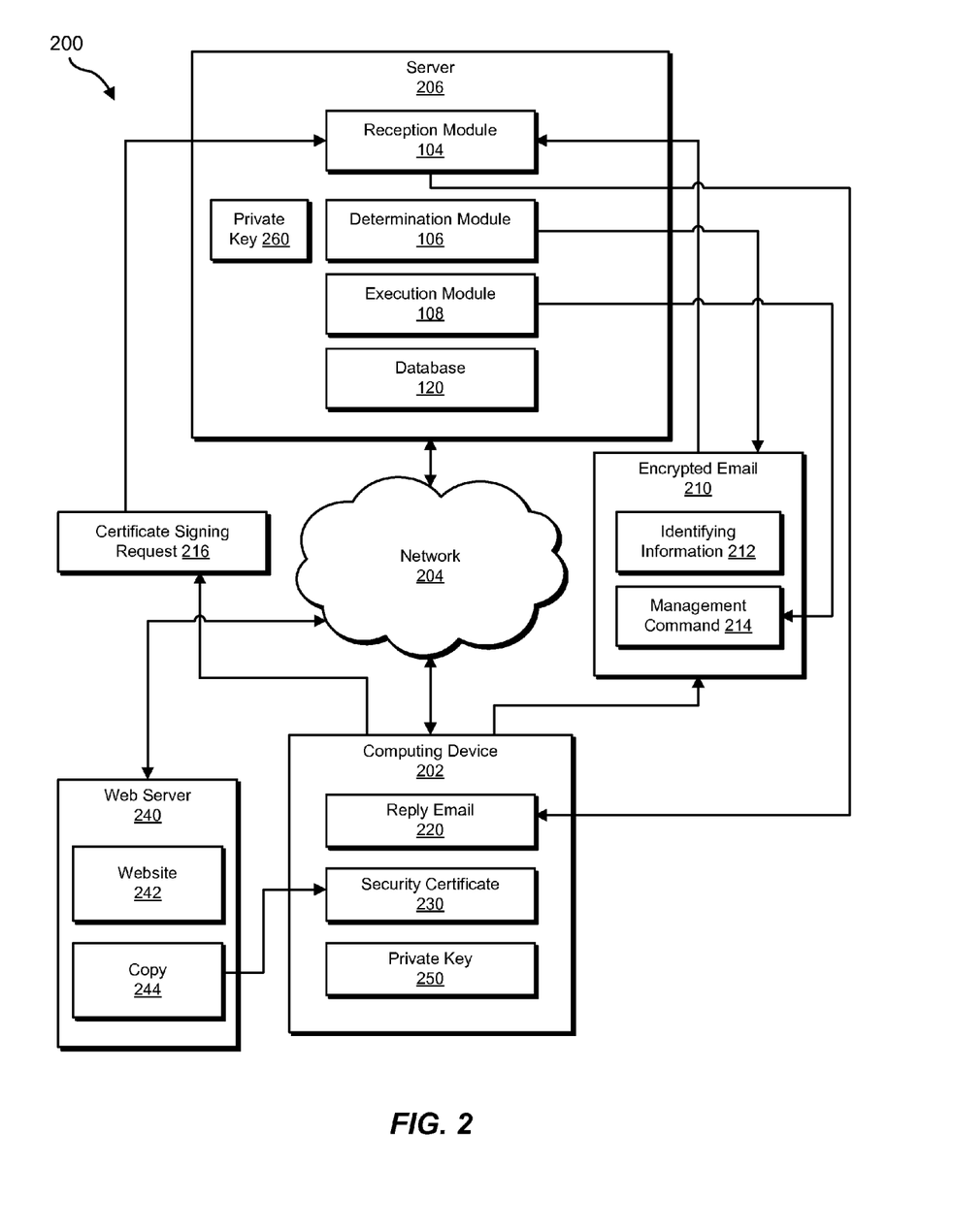
FIG. 2 is a block diagram of an additional exemplary system for managing security certificates through email.

The following will provide, with reference to FIGS. 1-2, detailed descriptions of exemplary systems for managing security certificates through email. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing security certificates through email. As illustrated in this figure, exemplary system 100 may include one or more modules 102 for performing one or more tasks. For example, and as will be explained in greater detail below, exemplary system 100 may include a reception module 104 that receives an encrypted email that contains both identifying information that identifies a security certificate for authenticating a website and a management command relating to the security certificate. Exemplary system 100 may also include a determination module 106 that determines whether authentication of the encrypted email succeeded such that the management command is authorized. In addition, and as will be described in greater detail below, exemplary system 100 may include an execution module 108 that, when a determination is made that authentication of the encrypted email succeeded, identifies the security certificate using the identifying information and executes the management command with respect to the identified security certificate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store security certificates 122. As used herein, the phrase "security certificates" generally refers to certificates that a computing or software component (e.g., a website) may provide to authenticate the component. For example, security certificates 122 may help ensure that a purported owner or administrator of the website is authentic. Examples of security certificates 122 may include a TRANSPORT LAYER SECURITY ("TLS") certificate and/or a SECURE SOCKETS LAYER ("SSL") certificate, either of which may be used with HYPERTEXT TRANSFER PROTOCOL SECURE functionality. Database 120 may also be configured to store emails 124, which may include emails that are digitally signed, that are encrypted, and/or that contain management commands, as discussed below.

Furthermore, database 120 may be configured to store information that identifies websites 126, which may provide security certificates 122. Similarly, database 120 may also be configured to store both management commends 128 and settings for management commands. These commands may be included within emails 124 and/or apply to security certificates 122, as discussed further below. Lastly, in some examples, database 120 may be configured to store encryption keys 130, which may include private-asymmetric, public-asymmetric, and/or (private) symmetric keys, such as those used in security certificates 122, as well as those used to encrypt and/or authenticate emails 124. In general, however, private keys may not be stored within a single database but instead kept private and secret to corresponding owners of each private key.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to manage security certificates through email. For example, and as will be described in greater detail below, one or more of modules 102 may cause computing device 202 and/or server 206 to receive an encrypted email 210 that contains both identifying information 212 that identifies a security certificate 230 for authenticating a website 242 and a management command 214 relating to security certificate 230. One or more of modules 102 may also cause computing device 202 and/or server 206 to determine whether authentication of encrypted email 210 succeeded such that management command 214 is authorized. As a last example, one or more of modules 102 may cause computing device 202 and/or server 206 to identify security certificate 230 using identifying information 212 and execute management command 214 with respect to security certificate 230. In some examples, modules 102 may cause these features to be performed when a determination is made that authentication of encrypted email 210 succeeded.

In the example of FIG. 2, an administrator, owner, and/or user of website 242, hosted on a web server 240, might desire to provide security for website 242 using security certificate 230. Accordingly, the individual may transmit a certificate signing request 216 to a certificate authority at server 206, which may provide services relating to security certificates. As used herein, the phrase "certificate authority" generally refers to third party authorities with public interfaces for providing security certificates and maintaining their integrity. The individual may digitally sign certificate signing request 216 using one of the individual's own private keys (e.g., a private key designated for SSL and/or TSL security), such as private key 250, as discussed further below. Upon receipt, server 206 may transmit a reply email 220 (which may be encrypted by a private key 260 of the certificate authority) that indicates that security certificate 230 is offered, available, and/or approved. The individual may accept security certificate 230, or perform any other management command for security certificate 230 (e.g., any command received by reception module 104), using encrypted email 210, as discussed further below. While using security certificate 230, the individual may ensure that web server 240 and website 242 have a copy 244 of security certificate 230 that they may provide to users who access website 242.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of issuing, managing, maintaining, and/or authenticating network components (e.g., websites), security certificates, and/or email. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
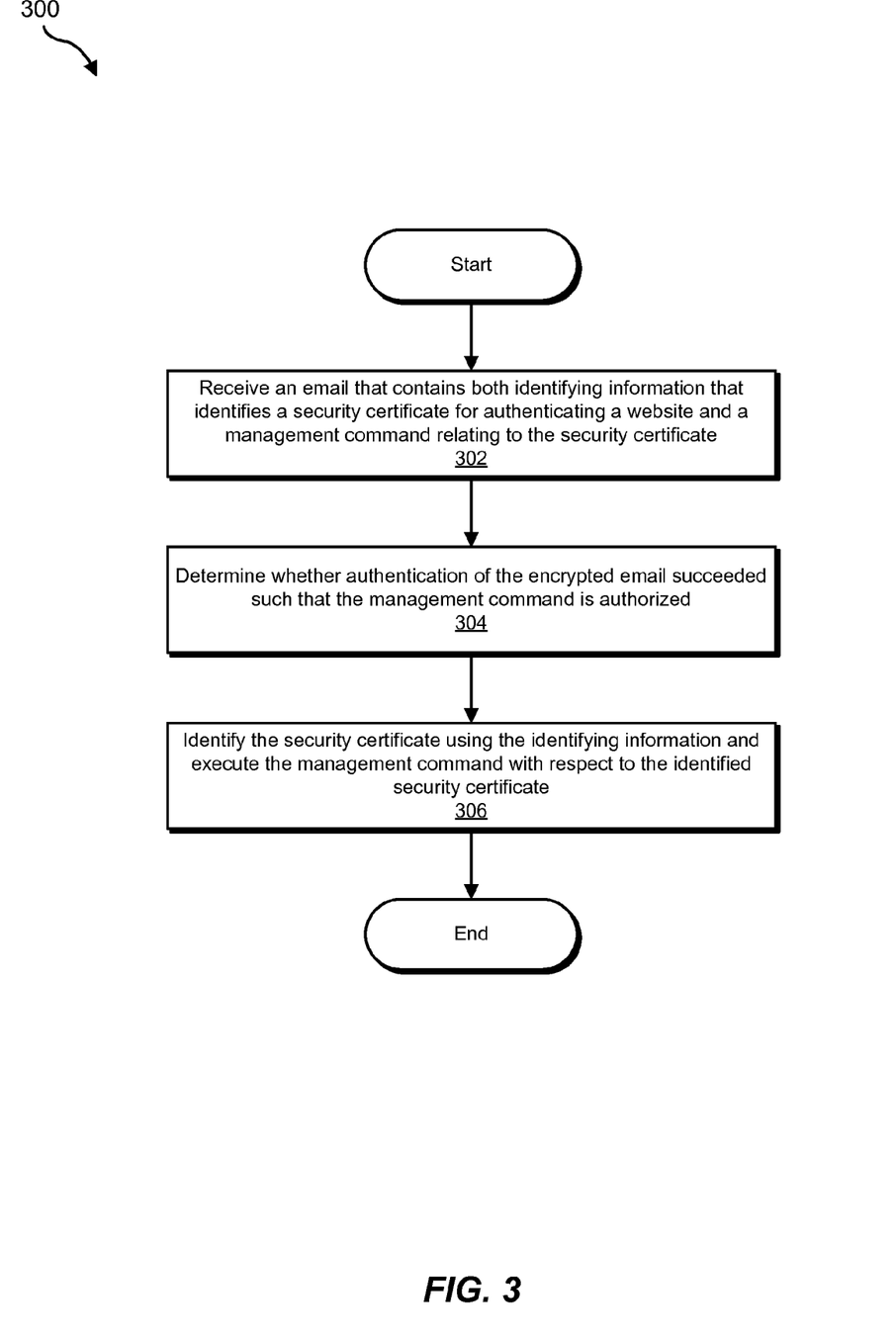
FIG. 3 is a flow diagram of an exemplary method for managing security certificates through email.

FIG. 3 is a flow diagram of an exemplary computer-implemented method 300 for managing security certificates through email. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive an encrypted email that contains both identifying information that identifies a security certificate for authenticating a website and a management command relating to the security certificate. For example, reception module 104 may, as part of server 206 in FIG. 2, receive encrypted email 210 that contains both identifying information 212 that identifies security certificate 230 for authenticating website 242 and management command 214 relating to security certificate 230.

As used herein, the phrase "identifying information" generally refers to any information that, whether alone or in combination with other information, identifies a security certificate. Similarly, as used herein, the phrase "management command" generally refers to any command that may be executed with reference to a security certificate as a parameter of the command (e.g., as one input that contributes to how the command is executed). In some examples, identifying information 212 that identifies security certificate 230 may include a serial number for security certificate 230 and/or a domain name that security certificate 230 authenticates. In further examples, identifying information 212 may additionally include a copy of security certificate 230.

Reception module 104 may receive encrypted email 210 in a variety of ways. In some examples, reception module 104 may receive encrypted email 210, which may correspond to a reply to a notification email, such as reply email 220, from a security certificate management service. Reply email 220, or a similar original (non-reply) email, may indicate an offer to issue security certificate 230, may indicate reception of certificate signing request 216, and/or may indicate any other information about an offered, granted, and/or pending certificate signing request and/or security certificate. In further examples, the security certificate management service may have sent reply email 220, which indicated the offer to issue security certificate 230, in response to certificate signing request 216.

Figure 4:
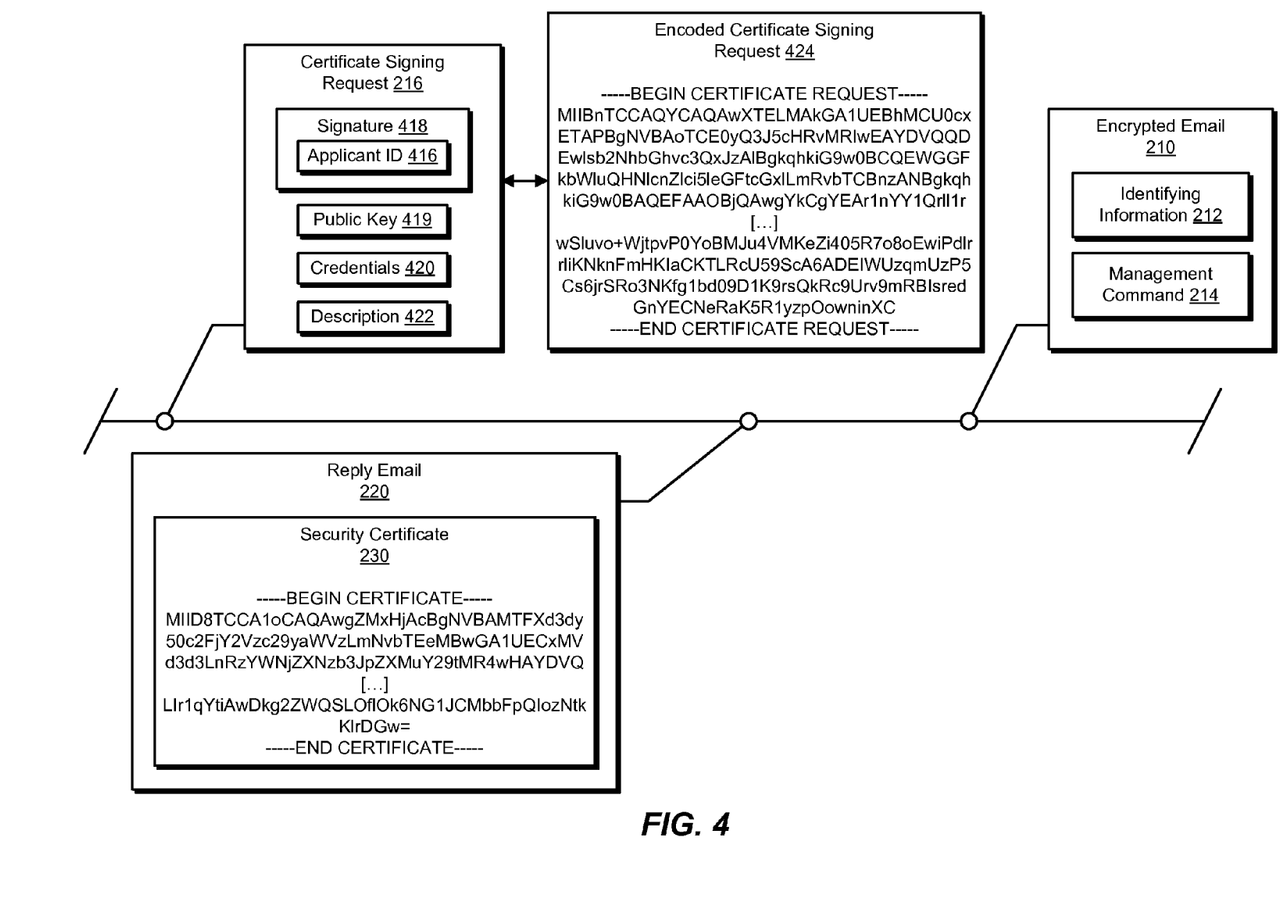
FIG. 4 is a timeline showing timing of sending a certificate signing request and corresponding emails.

FIG. 4 illustrates an exemplary timeline for sending certificate signing request 216 and corresponding emails. Accordingly, FIG. 4 illustrates an exemplary context in which the disclosed systems and methods may operate. As shown in FIG. 4, the individual associated with website 242 (e.g., owner) may first send certificate signing request 216 to server 206 (e.g., corresponding to a certificate authority). As further shown in FIG. 4, certificate signing request 216 may include application ID 416 that identifies the applicant for security certificate 230. Applicant ID 416 may include a distinguished name (e.g., in the case of a X.509 format certificate), which may correspond to a fully qualified domain name, and which may also correspond to identifying information 212. As shown in FIG. 4, applicant ID 416 may be digitally signed to include a digital signature 418 using a private key of the applicant. Moreover, certificate signing request 216 may further include a corresponding public key 419, credentials 420 (used to authenticate the applicant), and/or a description 422, which may describe a business/organization, department name or organization unit, town/city, province/region/county/state, country, and/or email address for the applicant. Furthermore, certificate signing request 216 may be encoded for transmission, as shown in FIG. 4 as an encoded certificate signing request 424.

In response to certificate signing request 216, the certificate authority may issue reply email 220, which may be optional. In some examples, reply email 220 may include security certificate 230, as further shown in FIG. 4. In other examples, reply email 220 may not contain security certificate 230 (e.g., as a zipped attachment), but instead contain a reference or link to download security certificate 230. In further examples, reply email 220 may not create access to security certificate 230 at all, but instead indicate that certificate signing request 216 is received and being processed, or has been declined.

In still further embodiments, the individual (and/or autonomous software) associated with website 242 may send encrypted email 210, received by reception module 104, as a reply to reply email 220. Alternatively, the individual may send encrypted email 210 without first receiving reply email 220, in response to a different email from the certificate authority, or without receiving any communication from the certificate authority. For example, right after sending certificate signing request 216, the individual associated with website 242 may transmit encrypted email 210, received by reception module 104, using one of the items of information in certificate signing request 216 as identifying information 212.

In some examples, reception module 104 may receive encrypted email 210 containing management command 214, which may include (1) an accept command to accept security certificate 230, (2) a revoke command to revoke security certificate 230, and/or (3) a reject command to reject security certificate 230. For example, a recipient of reply email 220 (e.g., owner of website 242), and/or computing device 202, may check one or more items of information in security certificate 230 for validity and/or consistency.

Although not shown in FIG. 4, security certificate 230 may generally include numerous fields, such as version, serial number, algorithm identifier, issuer, validity (not valid before date, and not valid after date), subject, subject public key info (e.g., public key algorithm and subject public key), issuer unique identifier, subject unique identifier, extensions, an affixed signing algorithm, and/or an affixed signature. In general, the recipient may evaluate the desirability, appropriateness, consistency (internal consistency between fields, and/or consistency with certificate signing request 216), validity, authenticity, and/or acceptability of any of these fields' contents. For example, to determine which management command 214 to place in encrypted email 210 (received by reception module 104), the recipient of reply email 220 may check whether any item, such as various extensions (e.g., for an extended-type security certificate) match one or more items described in certificate signing request 216. The recipient may similarly check whether the validity dates show that the certificate is currently valid, or are otherwise restrictive (or permissive) in an undesired manner (e.g., a determination is made that one or more dates are unacceptable). The recipient may similarly check the digital signature to authenticate the certificate as signed by the certificate authority. In further examples, the recipient may also check that security certificate 230 is still desired (e.g., not requested by an employee no longer at the organization, or applicable to a product/service that is discontinued). As a last example, the recipient may check whether any compromise of security has been detected during the obtaining of security certificate 230.

If any one or more of these (or similar) checks fails, in whole or in part, then the recipient (and/or corresponding computing device 202) may reject (or, later, revoke) security certificate 230. Otherwise, the recipient may approve of security certificate 230. The recipient may similarly renew security certificate 230 (e.g., prior to expiration of security certificate 230). Reception module 104 may, therefore, receive encrypted email 210 containing management command 214 as accept, reject, revoke, and/or renew. Management command 214 may similarly correspond to any other command that may take a security certificate (e.g., indicated by identifying information 212) as input or a parameter. For example, management command 214 may include commands to view details about security certificate 230 (e.g., view fields within security certificate 230, as discussed above), set a challenge phrase corresponding to security certificate 230, and/or view an audit trail for security certificate 230.

In some examples, reception module 104 may receive encrypted email 210 containing management command 214 in the form of literal text of the command. For example, encrypted email 210 may contain, as management command 214, literal text, and/or equivalents (e.g., foreign language equivalents), of "accept," "revoke," "renew," and/or "reject," as well as "view," "authenticate," "audit," "analyze," and/or "set challenge response" (where punctuation is optional).

In other examples, reception module 104 may receive encrypted email 210 containing management command 214 in the form of non-literal, symbolic, coded, and/or other formats. In fact, reception module 104 may receive management command 214 in any predefined format that reception module 104 (and modules 102 more generally) recognize as a command for executing on security certificate 230. Thus, reception module 104 and/or another one of modules 102 may recognize a single character and/or bit as management command 214 (e.g., approve, reject, etc.), when that specific information has been previously defined as the corresponding command. Reception module 104 and/or computing device 202 may specify and/or negotiate how management commands should be encoded or formatted, such as by sharing a command dictionary between reception module 104 and computing device 202 (in either direction). Thus, reception module 104 and/or computing device 202 may define, map, and/or establish various management commands 128 to any arbitrary number of bit strings, character strings, symbols, and/or graphics. The encoding, defining, mapping, and/or formatting of management commands 128 may be (1) established during a network handshake, (2) during establishment of a private key (or keys), (3) during establishment of a secure (encrypted and/or authenticated) email configuration, such as an S/MIME configuration, (4) through secure email after the secure email configuration has already been configured, for example, and/or (5) through hard encoding within a browser and/or email application. Moreover, in addition to the encrypting of encrypted email 210 as a whole, each of one or more management commands 128 may also be (initially) encrypted and/or signed within email 210 (e.g., using a different encryption key, such as a symmetric key and/or digital signature key pair).

Figure 5:
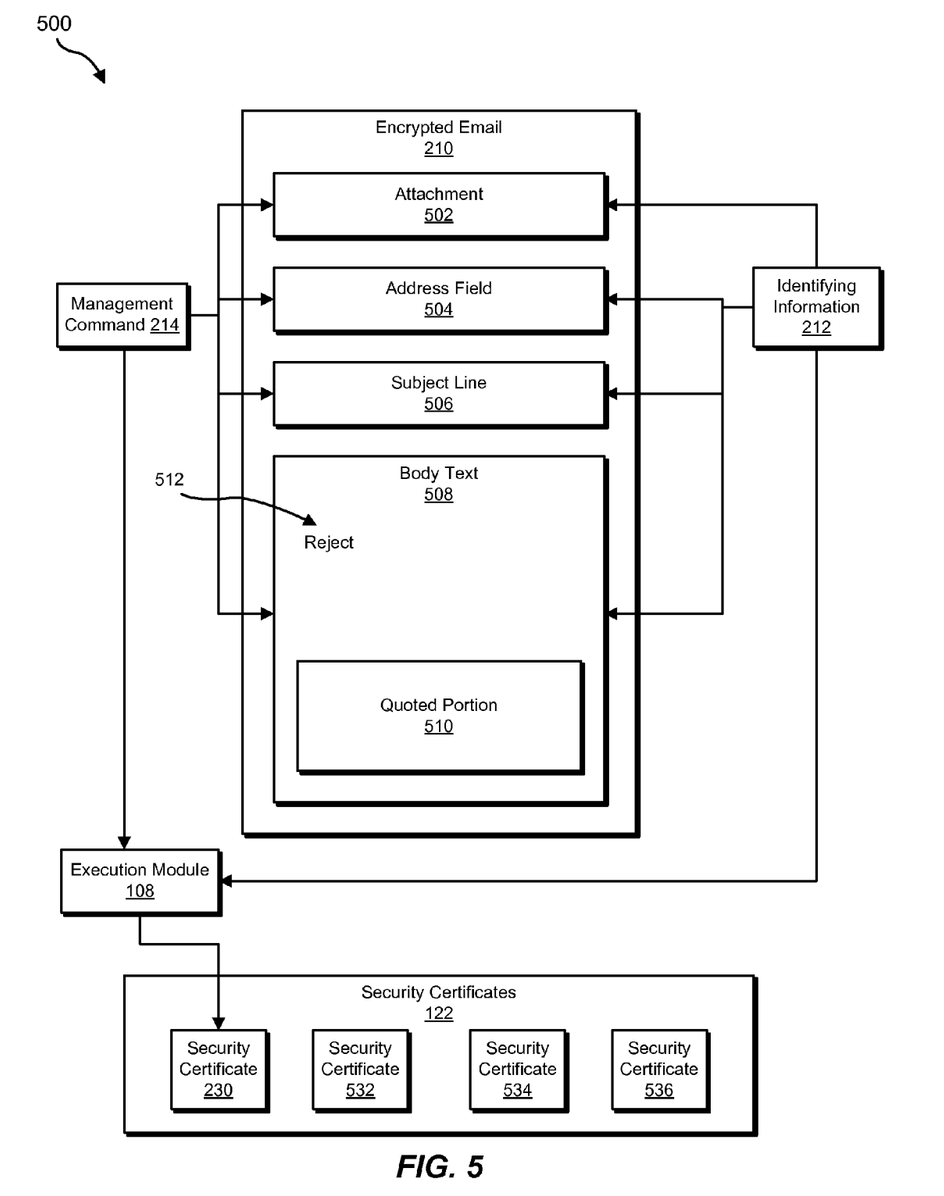
FIG. 5 is a block diagram of an exemplary email for managing security certificates.

In some examples, reception module 104 and/or computing device 202 may define not just content of management command 214, but also a designated position for management command 214 within encrypted email 210. The definitions may be stored within a dictionary, book, application code, and/or rule set, as discussed above, which may be located client-side, server-side, and/or proxy-side or elsewhere. FIG. 5 illustrates an example of encrypted email 210, which may include an attachment 502, address field 504, subject line 506, and/or body text 508 (which may also include a quoted portion 510). As shown in FIG. 5, management command 214 and/or identifying information 212 may be located at one or more locations within any of these fields (e.g., a single time, or multiple times across the same or different fields, for redundancy). In some examples, portions of management command 214 and/or identifying information 212 (and/or a hash, fingerprint, and/or program for reproducing the same) may be divided across multiple fields (including multiple sub-locations within these fields, as defined by a character, bit, line, and/or pixel offset or formula, whether the offset or formula is relative or absolute) within encrypted email 210. Management command 214 and/or identifying information 212 may also be marked and/or enclosed within brackets and/or delimiters to enable reception module 104 to more easily search for, locate, and/or identify them. Notably, identifying information 212 may already be included within quoted portion 510 and/or subject line 506 of encrypted email 210, as part of earlier reply email 220 (for example). Thus, identifying information 212 may correspond to a serial number, domain name, and security certificate, or other information that identifies security certificate 230, already included within encrypted email 210 as a reply to reply email 220 (thereby eliminating a need for an owner of website 242 to add further information to identify security certificate 230).

Reception module 104 and/or computing device 202 may define one or more of these locations as allowed, expected, and/or disallowed for identifying information 212 and/or management command 214. For example, all, many, and/or some locations may be defined as allowable for identifying information 212 and/or management command 214. In that case, reception module 104 may parse, scan, search, and/or check encrypted email 210 and/or the set of allowed or expected locations for identifying information 212 and/or management command 214.

Moreover, in some cases, reception module 104 may receive encrypted email 210 without already knowing whether encrypted email 210 (or part of the same) contains, and/or is intended to contain, identifying information 212 and/or management command 214 (or especially the pair of both of these). Accordingly, reception module 104 may scan some or all emails within a set of incoming emails and/or parts of these emails (e.g., within a specific point or period of time) for identifying information 212, management command 214, and/or a marker or identifier that marks the incoming email as containing management command 214. The marker may have predefined content (dynamic or static characters, symbols, bits, and/or pixels) and/or locations, as discussed above for identifying information 212 and/or management command 214. In other cases, reception module 104 may assume that all incoming email contains a management command.

Notably, in the case of address field 504 (e.g., a "to," "from," and/or "cc" type field), identifying information 212 and/or management command 214 may be encoded or included within the corresponding email address, which may be specific to security certificate 230 corresponding to identifying information 212 and/or specific to management command 214 (e.g., "approve-admin@symantec.com" or "approve-ID23532@symantec.com," where ID23532 corresponds to identifying information 212). Moreover, in some examples, identifying information 212 and management command 214 may be located within the same and/or different fields of encrypted email 210.

In general, reception module 104 may receive encrypted email 210, which may have been digitally signed using private key 250 (e.g., to authenticate an author of encrypted email 210) and encrypted using a symmetric key and/or a public key of the certificate authority (such that only the certificate authority may decrypt encrypted email 210 using its public key). In some cases, encrypted email 210 may have undergone multiple layers of encryption and/or signature (e.g., encrypting a message, signing the message, and then encrypting the combination of the message and the signature). Moreover, corresponding layers of encryption and/or signature may use the same or different keys (e.g., a first layer of encryption may use one key, while a later layer of encryption may use a different key). Any order or permutation of multiple layers of encryption and/or signature may be used as desired.

Returning to FIG. 3, at step 304 one or more of the systems described herein may determine whether authentication of the encrypted email succeeded such that the management command is authorized. For example, determination module 106 may, as part of server 206 in FIG. 2, determine whether authentication of encrypted email 210 succeeded such that management command 214 is authorized.

Determination module 106 may determine whether authentication of encrypted email 210 succeeded in a variety of ways. In general, determination module 106 may attempt to decrypt encrypted email 210 and also authenticate encrypted email 210, thereby verifying that the purported author of encrypted email 210 is the actual author and/or that the author is authorized to issue management command 214 (e.g., determination module 106 may determine that an individual purported to send encrypted email 210, and actually sent encrypted email 210, but is not authorized to issue management command 214). In some examples, determination module 106 may establish mappings or books of users and/or organizations authorized to issue management command 214. In other examples, determination module 106 may assume that only the owner or applicant for security certificate 230, as indicated by security certificate 230 and/or certificate signing request 216, is authorized to issue management command 214.

In some specific examples, determination module 106 may attempt to authenticate encrypted email 210 by applying a public key from a public key pair corresponding to a private key for secure email, thereby verifying that the owner of the private key authored encrypted email 210. For example, determination module 106 may authenticate encrypted email according to the S/MIME protocol and/or any similar protocol for securing and/or authenticating emails. In other examples, determination module 106 may similarly use a symmetric key to authenticate encrypted email 210. Notably, although FIG. 2 shows a single private key 250, client-side, on computing device 202, the certificate applicant (e.g., owner of website 242) may generally use one private key for secure email (e.g., S/MIME authentication), or even different keys for email signing and email encryption, while using a different private key for certificate signing request 216 (e.g., according to the SSL and/or TSL protocol). In other words, secure email such as S/MIME email and secure websites, such as those configured for SSL and/or TSL security, may both use private keys and these keys will generally be different.

Returning to FIG. 3, at step 306 one or more of the systems described herein may, when a determination is made that authentication of the encrypted email succeeded, identify the security certificate using the identifying information and execute the management command with respect to the identified security certificate. For example, execution module 108 may, as part of server 206 in FIG. 2, identify security certificate 230 using identifying information 212 and execute management command 214 with respect to security certificate 230.

Execution module 108 may execute management command 214, or decline to execute management command 214, in a variety of ways. For example, execution module 108 may first identify security certificate 230, from among security certificates 122, including security certificate 532, security certificate 534, and security certificate 536 (as shown in FIG. 5), using identifying information 212. Execution module 108 (e.g., in combination with other ones of modules 102) may also identify management command 214, such as literal command 512 ("reject") in FIG. 5, as described above.

In general, execution module 108 may condition execution of management command 214 on successful authentication (e.g., asymmetric key and/or S/MIME authentication) of encrypted email 210, such that execution module 108 executes management command 214 if or when authentication succeeds, and execution module 108 similarly declines to execute management command 214 if or when authentication fails.

Notably, execution module 108 may execute management command 214 based on a determination that authentication of encrypted email 210 succeeded without further input from an author of encrypted email 210. In other words, encrypted email 210 may be self-contained in the sense that sending encrypted email 210 is sufficient for the author of encrypted email 210 (e.g., owner of website 242) to execute management command 214. The author may thereby avoid the burden and inconvenience of logging into a web portal for a certificate management service, which may correspond to a server-side certificate authority, as discussed above. Instead of logging into the web portal (or other portal), the author may seamlessly and conveniently execute management command 214 from within the same email application or browser where the author learned about security certificate 230 (e.g., through reply email 220). Executing management commands such as "approve" and "revoke" may be as simple, therefore, as replying to an email that motivated or inspired the management command. The author of encrypted email 210 may not even need to switch applications or websites in order to execute management command 214.

Moreover, using secure email (e.g., S/MIME email) may enable the author of encrypted email 210 to avoid the burden of repeatedly logging into the web portal and/or entering security credentials. Instead, configuration of secure email, such as S/MIME email, through an email security certificate (for example), may enable all emails sent through that configuration to be automatically encrypted and digitally signed.

As a last example, execution module 108 may, upon executing management command 214, or declining to execute management command 214, automatically send a further reply email to a source of encrypted email 210 (e.g., owner of website 242). The further reply email may indicate: (1) that the management command 214 was executed, (2) that management command 214 was declined for execution, caused an error, is being processed, is being investigated (e.g., for a security breach), (3) details or description of security certificate 230 (e.g., if requested), (4) a reason for declining to execute management command 214 (such as resource overload, security breach, and/or lack of authorization), (5) an audit trail of security certificate 230 (e.g., if requested), (6) a challenge response configuration prompt or final configuration (e.g., if requested), and/or (7) that management command 214 resulted in a particular result or consequence, in terms of output and/or security (e.g., execution, or declining execution, of management command 214 resulted in approval/certification/rejection/revocation/renewal of a security certificate 230 and/or securing and/or compromising website 242).

As explained above, the disclosed systems and methods may enable web domain owners, and others associated with websites, to more easily and conveniently manage security certificates for authenticating websites. Specifically, in some examples, the disclosed systems and methods may enable individuals to execute management commands (such as accept, renew, revoke, and reject) through signed and encrypted emails without needing to access a certificate management service portal.

Figure 6:
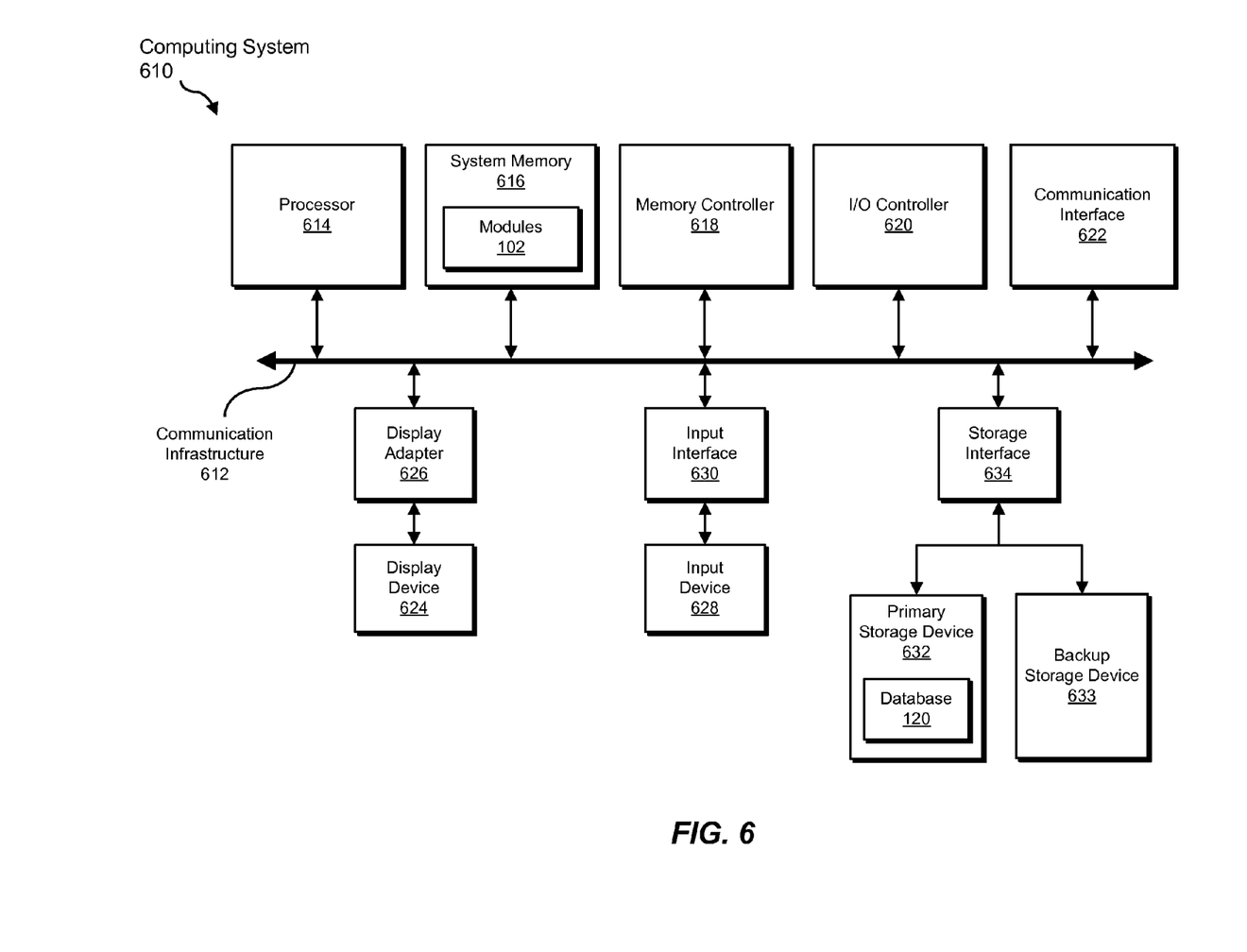
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
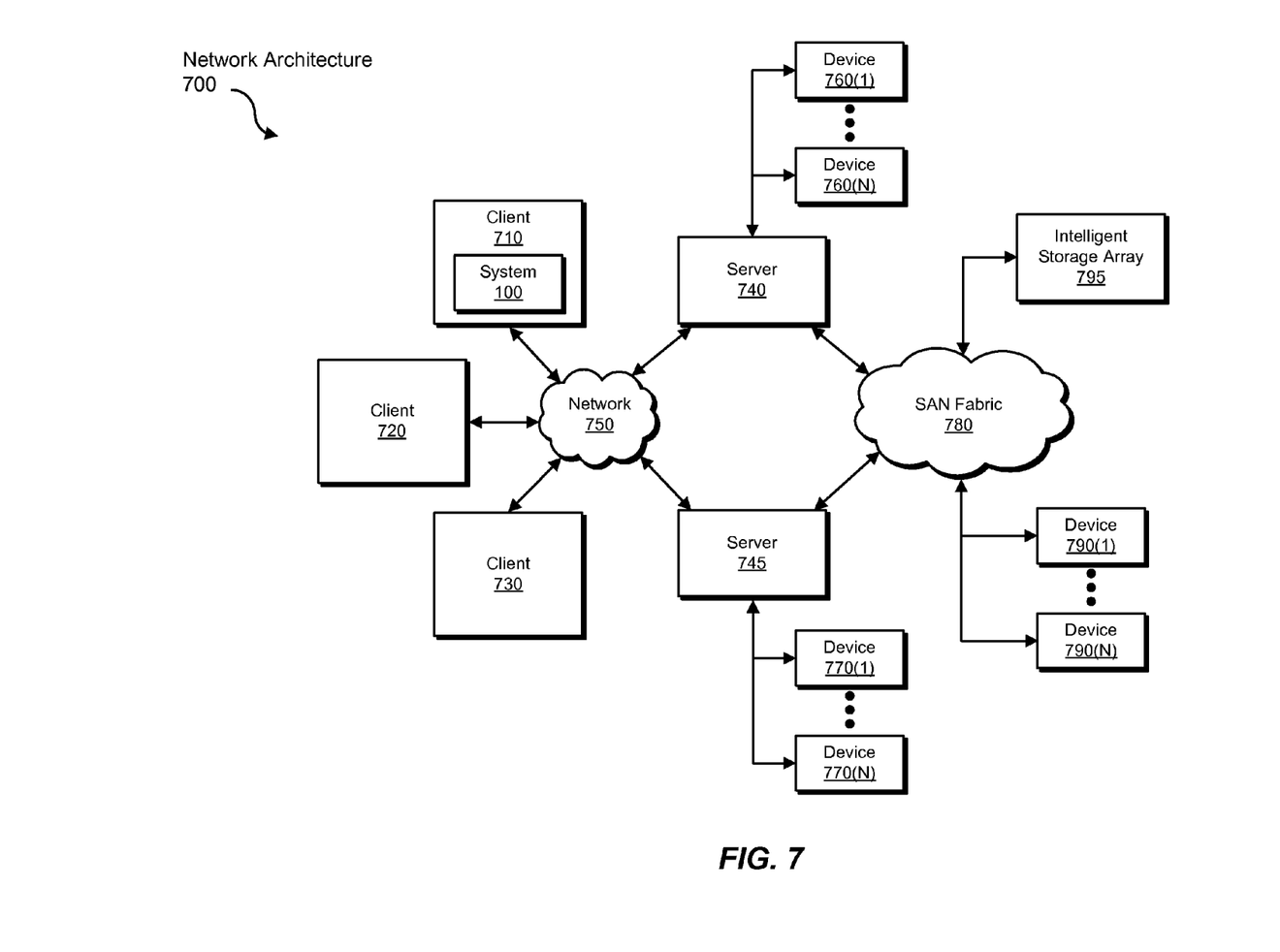
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing security certificates through email.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers)

to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a certificate signing request, management command, security certificate, encrypted email, and/or settings or properties associated with any of these, to be transformed, transform any one or permutation of these, output a result of the transformation to an output device, database, and/or memory, use the result of the transformation to manage security certificates and/or increase convenience and ease of use for managing security certificates, and store the result of the transformation to disk or other memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing security certificates through email, at least a portion of the method being performed by a computing device comprising at least one processor, the method comprising:
receiving an encrypted email that contains both identifying information that identifies a security certificate for authenticating a website and a management command relating to the security certificate, the encrypted email comprising a reply to a notification email, from a security certificate management service, that indicated an offer to issue the security certificate;
determining whether authentication of the encrypted email succeeded such that the management command is authorized;
when a determination is made that authentication of the encrypted email succeeded, identifying the security certificate using the identifying information and executing the management command with respect to the identified security certificate.

2. The computer-implemented method of claim 1, further comprising, when a determination is made that authentication of the encrypted email failed, declining to execute the management command.

3. The computer-implemented method of claim 1, wherein the management command comprises one of:
an accept command to accept the security certificate;
a revoke command to revoke the security certificate;
a reject command to reject the security certificate.

4. The computer-implemented method of claim 3, wherein the encrypted email contains, as the management command, literal text of at least one of:
"accept";
"revoke";
"reject".

5. The computer-implemented method of claim 1, wherein the management command is contained within at least one of:
a body of the encrypted email;
a subject line of the encrypted email;
an attachment to the encrypted email.

6. The computer-implemented method of claim 1, wherein the encrypted email is digitally signed to authenticate an author of the encrypted email.

7. The computer-implemented method of claim 6, wherein the encrypted email is digitally signed using a SECURE/MULTIPURPOSE INTERNET MAIL EXTENSIONS standard.

8. The computer-implemented method of claim 1, wherein the identifying information that identifies the security certificate comprises at least one of:
a serial number for the security certificate;
a domain name that the security certificate authenticates.

9. The computer-implemented method of claim 1, further comprising executing the management command based on the determination that authentication of the encrypted email succeeded without further input from an author of the encrypted email.

10. The computer-implemented method of claim 1, further comprising, upon executing the management command, automatically sending a reply email to a source of the encrypted email, the reply email indicating that the management command was executed.

11. The computer-implemented method of claim 1, wherein the security certificate comprises a TRANSPORT LAYER SECURITY certificate.

12. The computer-implemented method of claim 1, wherein the security certificate management service sent the notification email that indicated the offer to issue the security certificate in response to a certificate signing request.

13. The computer-implemented method of claim 1, wherein the security certificate comprises
a SECURE SOCKETS LAYER certificate.

14. The computer-implemented method of claim 1, wherein the identifying information that identifies the security certificate comprises a copy of the security certificate.

15. A system for managing security certificates through email, the system comprising:
a reception module, stored in memory, that receives an encrypted email that contains both identifying information that identifies a security certificate for authenticating a website and a management command relating to the security certificate, the encrypted email comprising a reply to a notification email, from a security certificate management service, that indicated an offer to issue the security certificate;
a determination module, stored in memory, that determines whether authentication of the encrypted email succeeded such that the management command is authorized;
an execution module, stored in memory, that, when a determination is made that authentication of the encrypted email succeeded, identifies the security certificate using the identifying information and executes the management command with respect to the identified security certificate;
at least one processor that executes the reception module, the determination module, and the execution module.

16. The system of claim 15, wherein the execution module, when a determination is made that authentication of the encrypted email failed, declines to execute the management command.

17. The system of claim 15, wherein the management command comprises one of:
an accept command to accept the security certificate;
a revoke command to revoke the security certificate;
a reject command to reject the security certificate.

18. The system of claim 15, wherein the management command is contained within at least one of:
a body of the encrypted email;
a subject line of the encrypted email;
an attachment to the encrypted email.

19. The system of claim 15, wherein the encrypted email is digitally signed to authenticate an author of the encrypted email.

20. A non-transitory computer-readable medium comprising one or more computer-executable instructions that, when executed by at least one processor of a computing device, cause the computing device to:
receive an encrypted email that contains both identifying information that identifies a security certificate for authenticating a website and a management command relating to the security certificate, the encrypted email comprising a reply to a notification email, from a security certificate management service, that indicated an offer to issue the security certificate;
determine whether authentication of the encrypted email succeeded such that the management command is authorized;
when a determination is made that authentication of the encrypted email succeeded, identify the security certificate using the identifying information and execute the management command with respect to the identified security certificate.

* * * * *